United States Patent
Lee

(10) Patent No.: US 7,233,603 B2
(45) Date of Patent: Jun. 19, 2007

(54) METHOD FOR PERFORMING CONTENTION-BASED ACCESS FOR REAL-TIME APPLICATION AND MEDIUM ACCESS CONTROL HIERARCHY MODULE

(75) Inventor: Jae-Ho Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 950 days.

(21) Appl. No.: 10/290,948

(22) Filed: Nov. 8, 2002

(65) Prior Publication Data

US 2004/0004973 A1    Jan. 8, 2004

(30) Foreign Application Priority Data

Jul. 8, 2002    (KR) ..................... 10-2002-0039503

(51) Int. Cl.
*H04L 12/413* (2006.01)
*H04B 7/212* (2006.01)

(52) U.S. Cl. .................. 370/445; 370/444; 370/447; 370/448

(58) Field of Classification Search .................. None
See application file for complete search history.

(56) References Cited

U.S. PATENT DOCUMENTS

| | | | | | |
|---|---|---|---|---|---|
| 4,623,886 | A | * | 11/1986 | Livingston | 370/462 |
| 6,256,334 | B1 | * | 7/2001 | Adachi | 375/132 |
| 2002/0085582 | A1 | * | 7/2002 | Kim | 370/445 |
| 2002/0163933 | A1 | * | 11/2002 | Benveniste | 370/465 |
| 2003/0117984 | A1 | * | 6/2003 | Gavette | 370/338 |

* cited by examiner

*Primary Examiner*—Chirag G. Shah
(74) *Attorney, Agent, or Firm*—The Farrell Law Firm

(57) ABSTRACT

A MAC (Medium Access Control) hierarchy module for performing a back-off procedure for real-time application in a station having a frame to be transmitted in a network including a plurality of stations, includes: a priority identification sub-module for identifying a priority of each data to be transmitted; a first CW (Contention Window) generation sub-module for pseudo-randomly generating a CW based on the priority of the data to be transmitted; a back-off time calculation/back-off process sub-module for calculating a back-off time based on the CW and performing the back-off procedure based on the back-off time; and a second CW generation sub-module for randomly generating another CW when there is a collision between transmissions of data having same-order priorities.

4 Claims, 7 Drawing Sheets

METHOD FOR PERFORMING CONTENTION-BASED ACCESS FOR REAL-TIME APPLICATION AND MEDIUM ACCESS CONTROL HIERARCHY MODULE

PRIORITY

This application claims priority to an application entitled "METHOD FOR PERFORMING CONTENTION-BASED ACCESS FOR REAL-TIME APPLICATION AND MEDIUM ACCESS CONTROL HIERARCHY MODULE", filed in the Korean Industrial Property Office on Jul. 8, 2002 and assigned Serial No. 2002-39503, the contents of which are incorporated herein by reference.

BACKGROUND OF THE INVENTION

1. Field of the Invention

The present invention relates to a communication protocol, and more particularly to a MAC (Medium Access Control) protocol in a LAN (Local Area Network) communication system.

2. Description of the Related Art

Wireless LAN (Local Area Network) services conducted through a public network, which can be implemented by a next-generation wired/wireless communication integration technique, will become an important requirement in next-generation communication markets. A wireless LAN is expected to qualitatively change the IT (Information Technology) industry. In particular, because the wireless LAN coupled to the public network is associated with mobile communication terminals such as a notebook computer, a PDA (Personal Digital Assistant), etc., the quantitative growth of related industries is expected to be accelerated. The number of users requiring multimedia data continuously increases in current communication networks. Similarly, the users will also desire to receive the multimedia data through the wireless LAN.

The wireless LAN being widely used has been implemented on the basis of an IEEE (Institute of Electronic and Electrical Engineers) 802.11 standard. A basic access in a MAC (Medium Access Control) hierarchy protocol of the IEEE 802.11 standard is performed by a DCF (Distributed Coordination Function). The DCF is based on CSMA/CA (Carrier Sense Multiple Access/Collision Avoidance). Through the CSMA/CA, all stations can equally occupy a common medium. The DCF in the MAC hierarchy protocol makes the stations wait for a period of time equal to a DIFS (Distributed Inter Frame Space) using a random back-off algorithm so that the medium can be equally assigned to the stations using one medium. The CSMA/CA also includes an optional PCF (Point Coordination Function), which is used to set up an access point as a point coordinator. In this function, the point coordinator assigns a priority and processes predetermined time-bounded information. The PCF makes the stations wait for a period of time equal to a PIFS (Point coordination IFS (Inter Frame Space)), and shorter than the DIFS, using the random back-off algorithm. Data used in the PCF has a higher-order priority than that used in the DCF. However, the PCF cannot set a plurality of priorities, but can only identify whether there is a priority. Further, the PCF allows the station to access the medium irrespective of the priority in a back-off time.

The DCF for the basic access in the MAC hierarchy protocol makes all the stations equally occupy the medium in relation to all data. Accordingly, delay-sensitive data such as video, voice and audio data, and asynchronous data such as e-mail data and file data for transmission can be equally processed. When a station transmits an MPDU (MAC Protocol Data Unit) through a conventional DCF or PCF access method, it waits for the period of time equal to the DIFS or the PIFS and then generates the back-off time using a pseudo random number, thereby performing a back-off procedure. The stations pseudo-randomly generate the back-off time irrespective of the priority in the conventional DCF or PCF access method, thereby maximize the equal use of occupying the medium. Further, the access method is conventionally performed on the basis of the priority. In other words, when the MPDU having the priority is transmitted, the PCF based on the priority allows the station to quickly occupy the medium by using the PIFS shorter than the DIFS used in the DCF, thereby reducing a period of waiting time. However, the PCF cannot assign different priorities through several stages. In the PCF, the back-off time is equally set irrespective of the priority and the back-off procedure based on the equally set back-off time is performed.

FIG. 1 is a view explaining a conventional basic access method.

Referring to FIG. 1, stations occupy a medium through an access contention. When a station attempts a data transmission in the case where the medium is in a busy state, the station trying to perform the data transmission recognizes the busy state of the medium. Thereafter, the station waits until a current transmission stops. After the current data transmission stops, the station waits for a period of time equal to an inter-frame space, e.g., IFS, PIFS or DIFS, and sets a back-off time on the basis of a value of a generated CW (Contention Window). Thus, the station waits for an MPDU transmission while performing a back-off procedure.

FIG. 2 is a view explaining a method for occupying a medium in stations on the basis of the conventional basic access method. In connection with FIG. 2, a detailed description will be given of a method for occupying the medium in the stations under an access contention through a back-off procedure based on a back-off time. Referring to FIG. 2, the stations occupy the medium irrespective of a priority and transmit a frame of an MPDU. First, a station sets a waiting time based on a value of the CW pseudo-randomly generated and occupies the medium after the waiting time based on the value of the CW. After the back-off time is set, a back-off slot corresponding to a period of idle time is removed. Accordingly, as the station has a longer waiting time, an opportunity to transmit the MPDU frame is increased. Through this procedure, the stations can maximize the equal use of the medium through the access contention. Any station having the MPDU frame can set the back-off time by generating a pseudo random number. The stations have the same value of the CW.

FIG. 3 is a flow chart explaining a conventional method for occupying a medium through a back-off procedure. FIG. 3 is a flow chart illustrating a control method to be performed in a MAC hierarchy module when a station accesses the medium in a network in which a plurality of stations can be coupled to one medium.

Referring to FIG. 3, the station tries to transmit a frame of an MPDU at step 20. If the station fails to transmit the MPDU frame, it delays the transmission of the MPDU frame for a period of time equal to a DIFS or PIFS at step 22. A pseudo random number for each of all the stations is generated within a constant range irrespective of a priority at step 24 and a value of a CW is generated at step 26. A back-off time is generated on the basis of the pseudo random number and the CW value at step 28. The station occupies the medium using the back-off procedure and tries to re-transmit the MPDU frame at step 30.

After the station performs the back-off procedure, it is determined at step 32 whether there is a collision between data transmissions. If there is the collision between data transmissions, the station determines at step 34 whether the number of re-transmission times is less than a reference value representing a limit of the number of re-transmission times. If the number of re-transmission times is less than the reference value, the CW value is changed to a next CW value greater than the CW value according to the equation $2^k-1$, where k is a positive integer, at step 40. The station performs the back-off procedure and tries to re-transmit the MPDU frame by occupying the medium. When there is the collision between data transmissions, the MPDU frame is re-transmitted the limited number of re-transmission times. If the MPDU frame has been successively transmitted or the MPDU frame has been re-transmitted the limited number of re-transmission times, the CW value is re-set at step 36. Through this procedure, medium occupation is performed so that the station can transmit the MPDU frame. The medium occupation is performed under same conditions irrespective of contents of the MPDU frame. Thus, the stations can equally occupy the medium. Because the conventional method shown in FIG. 3 does not process time-bounded information, there is a problem in that it is difficult for data to be processed within a required time period.

When video data, audio data and voice data being time-bounded information are processed in the DCF, data transmission is delayed to cause the communication of the video data, the audio data and the voice data to be cut off in the middle of communication or to cause the video, audio and voice data to be lost. At this time, the communication of the video data, the audio data and the voice data cannot be properly performed. In other words, the MAC hierarchy protocol supports general data communication on the basis of the wireless LAN (IEEE 802.11) widely used, but cannot properly process the time-bounded information such as the video data, the audio data and the voice data. An improvement of the conventional method is seriously needed to effectively process the video data, the audio data and the voice data and perform data communication without loss of data. An optional PCF provided by the IEEE 802.11 standard is used for real-time application. However, the optional PCF cannot assign different priorities through several stages and can only recognize whether there is a priority or not. Further, the optional PCF is used to set up an access point as a point coordinator. There are two operating modes including an infrastructure mode and an ad-hoc mode in the IEEE 802.11 standard. The optional PCF is operable in the infrastructure mode. However, the optional PCF is not operable in the ad-hoc mode.

In other words, the MAC hierarchy protocol appropriately supports the general data communication on the basis of the wireless LAN (IEEE 802.11) widely used, but cannot process the time-bounded information such as the video data, the audio data and the voice data. An improvement of the conventional method is seriously needed to effectively process the video data, the audio data and the voice data and perform data communication without loss of data.

SUMMARY OF THE INVENTION

Therefore, the present invention has been made in view of the above problems, and it is an object of the present invention to provide a method for performing a contention-based access for real-time application and a medium access control hierarchy module, which can minimize transmission delay of video data and voice data by assigning priorities to the data through several stages in a station.

In accordance with an aspect of the present invention, the above and other objects can be accomplished by the provision of a MAC (Medium Access Control) hierarchy module for performing a back-off procedure for real-time application in a station having a frame to be transmitted in a network including a plurality of stations, comprising: a priority identification sub-module for identifying a priority of each data to be transmitted; a first CW (Contention Window) generation sub-module for pseudo-randomly generating a CW based on the priority of the data to be transmitted; a back-off time calculation/back-off process sub-module for calculating a back-off time based on the CW and performing the back-off procedure based on the back-off time; and a second CW generation sub-module for randomly generating another CW when there is a collision between transmissions of data having same-order priorities.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may obscure the subject matter of the present invention.

With the advent and development of new applications, transmission of delay-sensitive data such as video data, audio data and voice data is needed. In order to support real-time applications, a method capable of assigning priorities through several stages in a station is needed. When the video data, the audio data and the voice data are processed by a method proposed in the present invention, delay of the data having a higher-order priority is minimized and therefore its loss is reduced. Accordingly, a phenomenon of the video data, the audio data and the voice data being cut off in the middle of communication and the data loss can be reduced or removed, so that multimedia communication can be smoothly performed.

Figure 1:
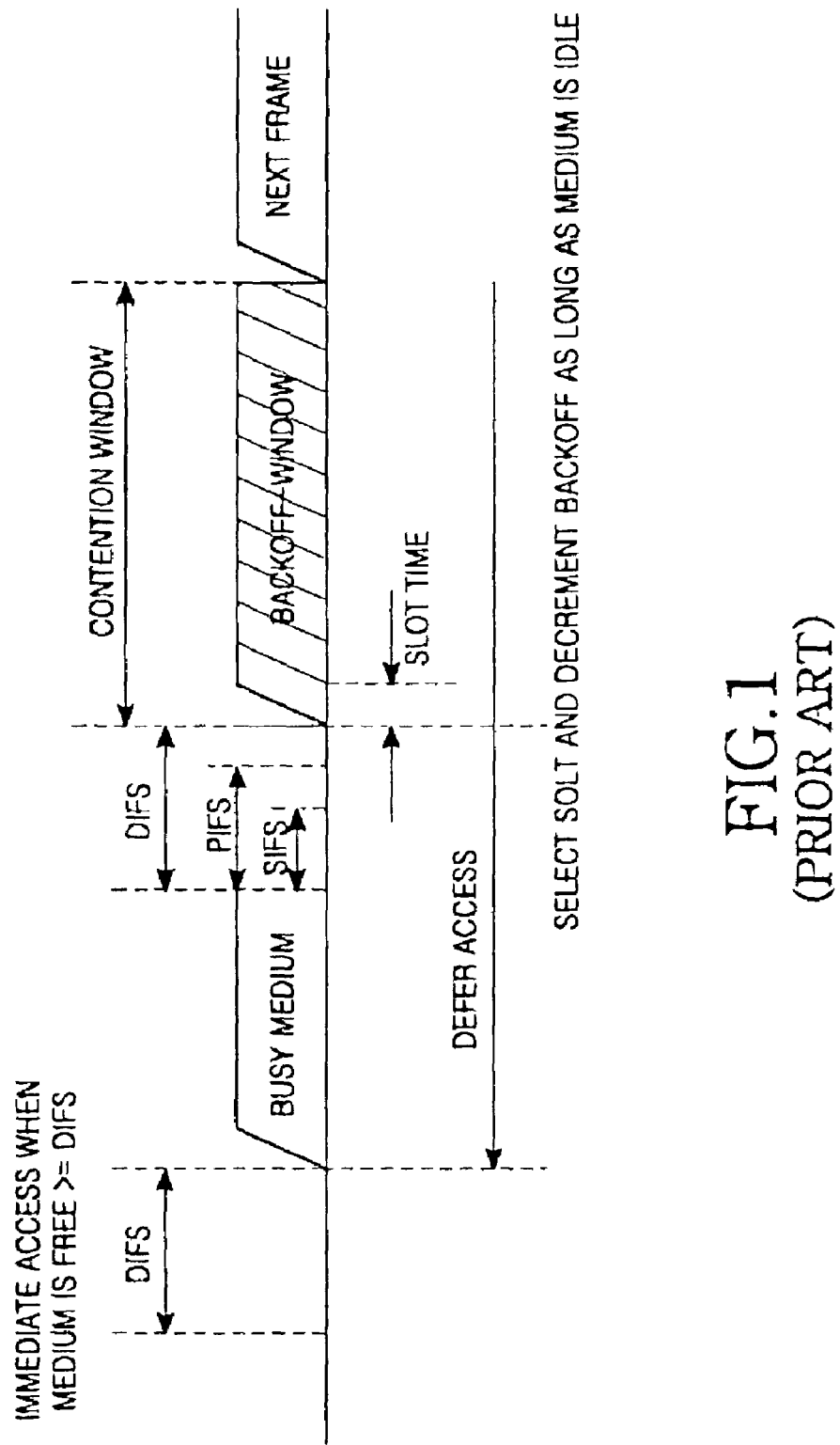
FIG. 1 is a view explaining a conventional basic access method.
Figure 2:
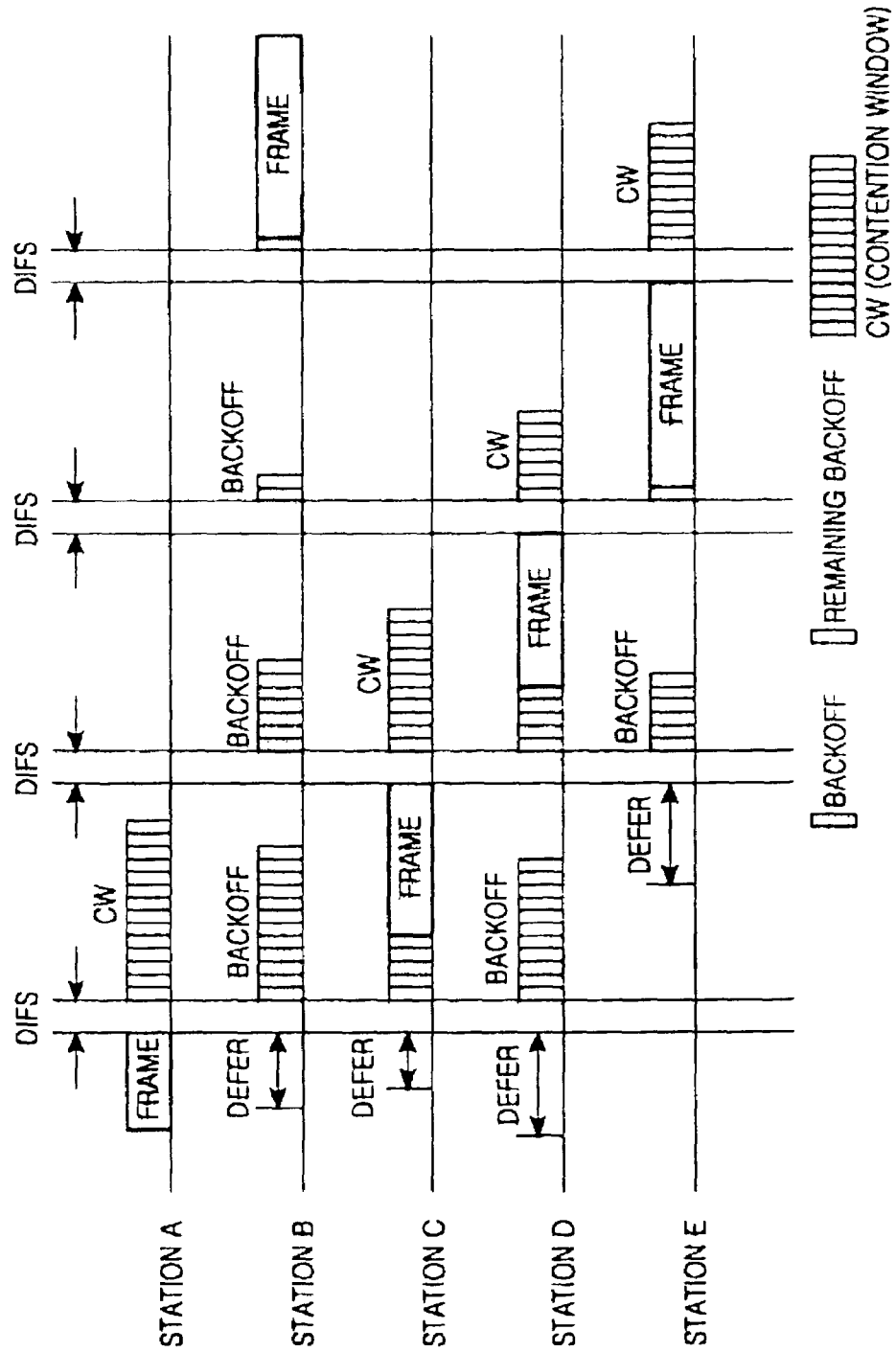
FIG. 2 is a view explaining a method for occupying a medium in stations on the basis of the conventional basic access method.
Figure 3:
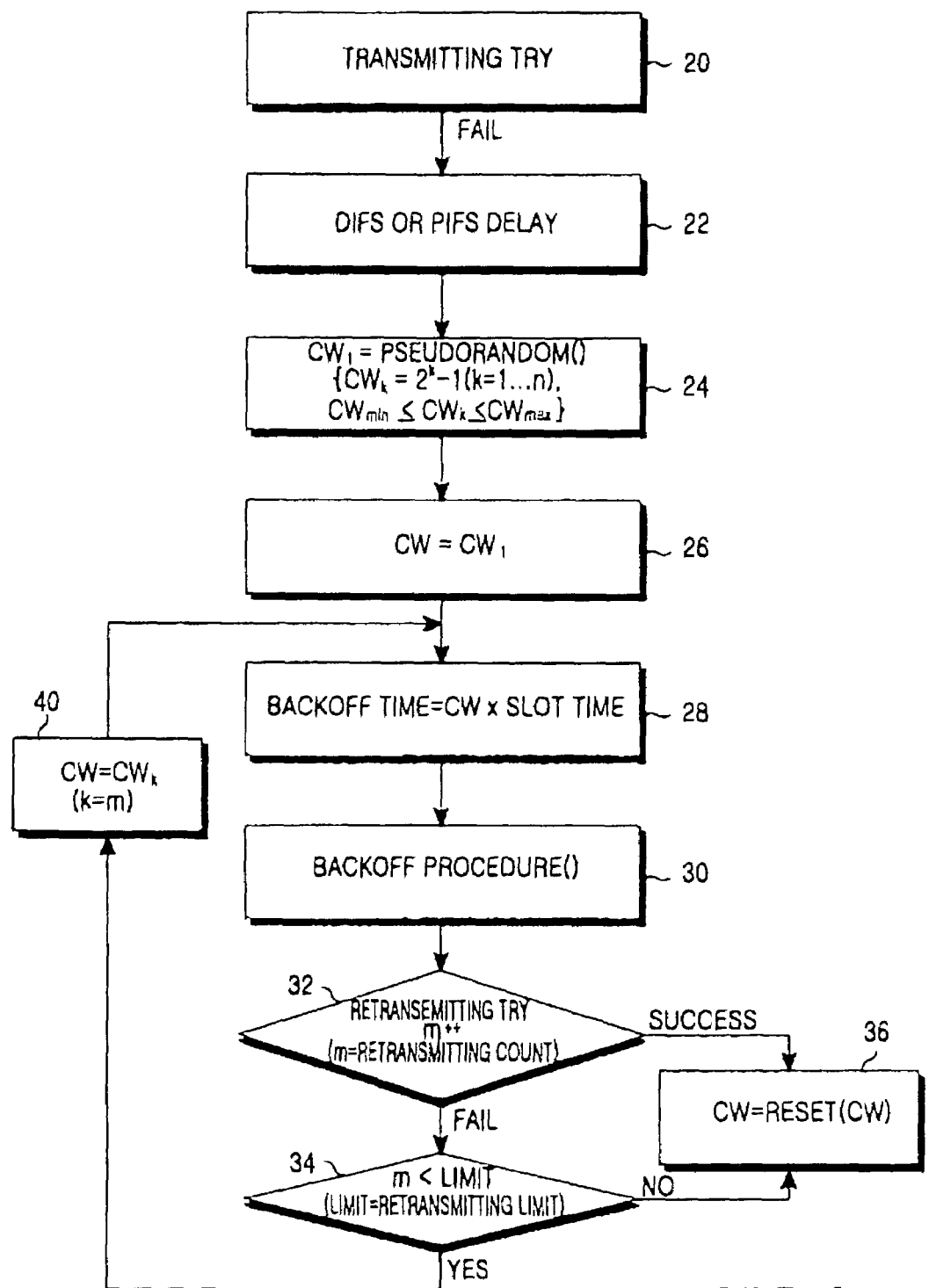
FIG. 3 is a flow chart explaining a conventional method for occupying a medium through a back-off procedure.
Figure 4:
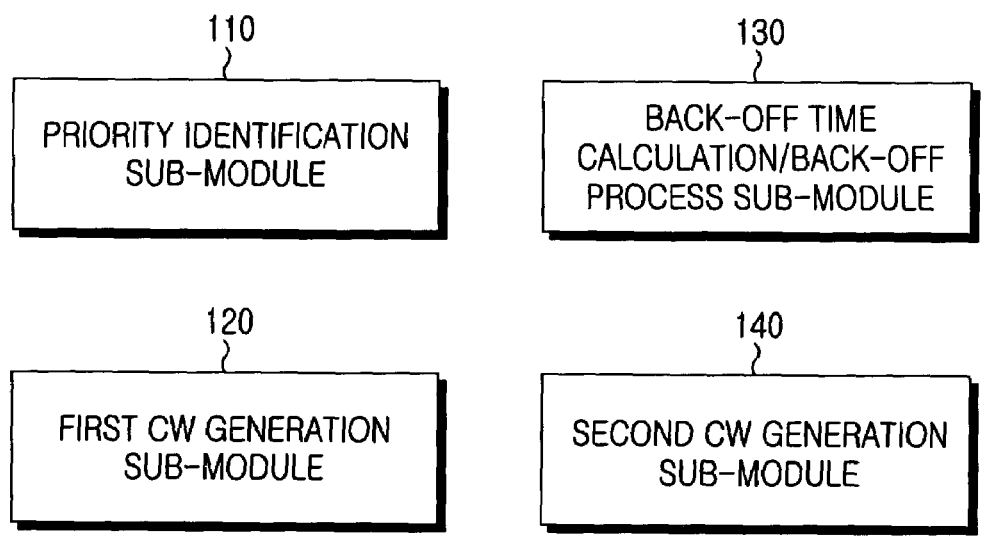
FIG. 4 is an exemplary block diagram illustrating a MAC (Medium Access Control) hierarchy module in accordance with an embodiment of the present invention.

FIG. 4 is an exemplary block diagram illustrating a MAC (Medium Access Control) hierarchy module in accordance with the present invention.

Referring to FIG. 4, the MAC hierarchy module includes four components. The four components are a priority identification sub-module 110, a first CW (Contention Window) generation sub-module 120, a back-off time calculation/back-off process sub-module 130 and a second CW generation sub-module 140. The priority identification sub-module 110 identifies a priority of each data to be transmitted. The first CW generation sub-module 120 generates each CW based on the priority of the data to be transmitted using a pseudo random function of "PseudoRandom ( )". The back-off time calculation/back-off process sub-module 130 calculates a back-off time and performs a back-off procedure based on the back-off time. The second CW generation sub-module 140 generates another CW using a random function of "Random ( )" when there is a collision between transmissions of the data having same-order priorities.

An access method in accordance with the present invention assigns a priority to data according to the type of data to be transmitted. When a station transmits an MPDU (MAC Protocol Data Unit) using the DCF (Distributed Coordination Function) or PCF (Point Coordination Function) access method, the station generates a pseudo random number based on the priority and then generates the back-off time while it waits for a period of time equal to a DIFS (Distributed Inter Frame Space) or PIFS (Point coordination IFS (Inter Frame Space)). As the back-off time is shortened, a priority corresponding to the back-off time becomes greater. In other words, as a period of waiting time required for occupying a medium is shorter, a higher-order priority is given for the medium occupation. When there is a collision between transmissions of the MPDUs having same-order priorities, the second CW generation sub-module 140 generates the CW through the random function of "Random ( )" rather than the pseudo random function of "PseudoRandom ( )" within the range of a CW set on a priority basis. Thereafter, the back-off procedure is performed so that the MPDU can be transmitted.

In accordance with the present invention, data having a higher-order priority quickly and frequently occupies the medium so that it can be transmitted within a predetermined period of time. The following Equation 1 is used to set the back-off time based on the priority.

When Priority I>Priority II>Priority III, $CW_{PXi}$=PseudoRandom ( )

$CW_{PXi}=2^i-1$ ($\log_2 CW_{min}-1 < i < \log_2 CW_{max}+1$)

$CW_{min} < CW_{PIi} < CW_{PIIi} < CW_{PIIIi} < CW_{max}$ where
$CW_{PIi}$=Priority I Contention Window,
$CW_{PIIi}$=Priority II Contention Window and
$CW_{PIIIi}$=Priority III Contention Window.  Equation 1

As shown in Equation 1, as the priority is higher, a value of a CW becomes lower. Accordingly, the back-off time calculated with a CW slot time becomes reduced. If the back-off time is reduced, a period of time required for occupying the medium is reduced and thus an opportunity to occupy the medium is higher. In other words, a higher-order priority is given for the medium occupation. The present invention can be applied to both DCF and PCF access methods. The method of the present invention provides priorities through three stages, while the conventional method identifies priorities through two stages only, whether there is any priority or not.

Figure 5:
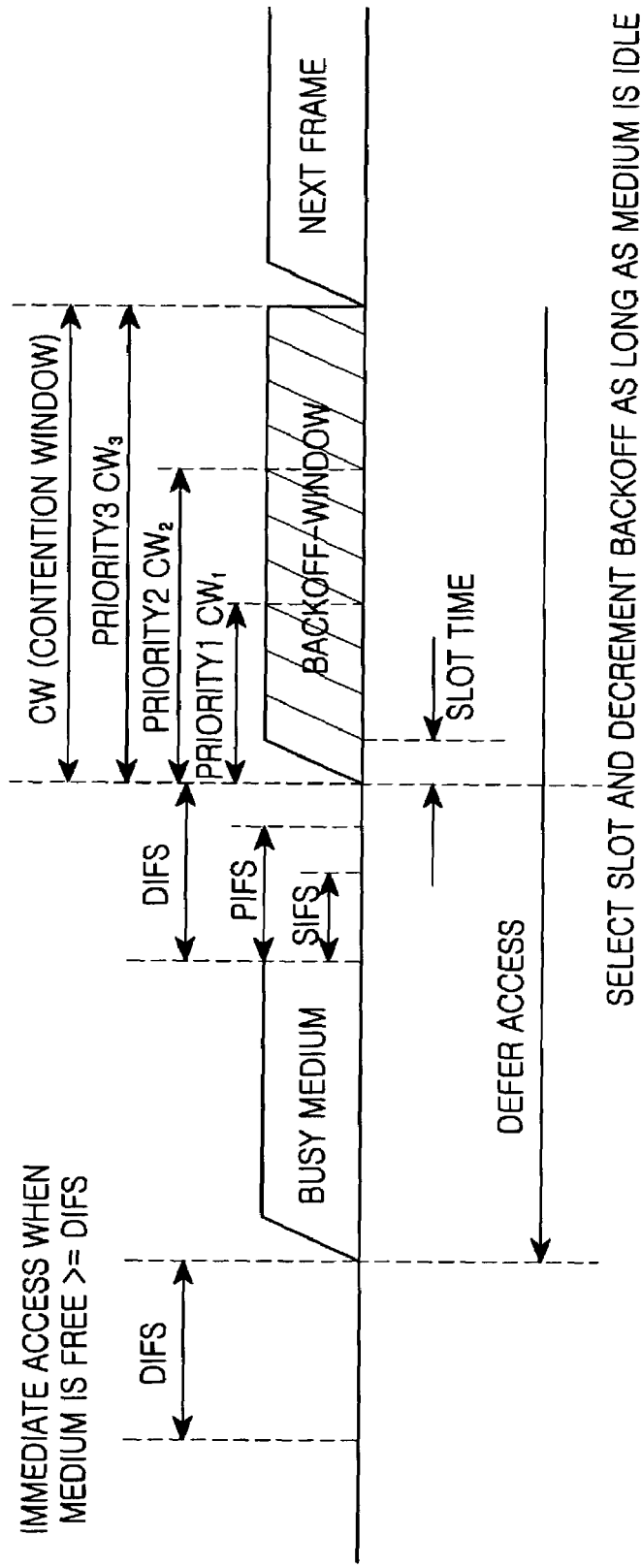
FIG. 5 is an exemplary view explaining an access method using a back-off time based on a priority in accordance with an embodiment of the present invention.

FIG. 5 is an exemplary view explaining an access method using a back-off time based on a priority in accordance with the present invention.

Referring to FIG. 5, periods of back-off times are differently generated on the basis of different priorities. Thus, periods of waiting times for which a station waits to occupy the medium are different. Since the back-off procedure in the present invention is the same as the conventional back-off procedure, a description of the back-off procedure will be omitted in this specification.

Figure 6:
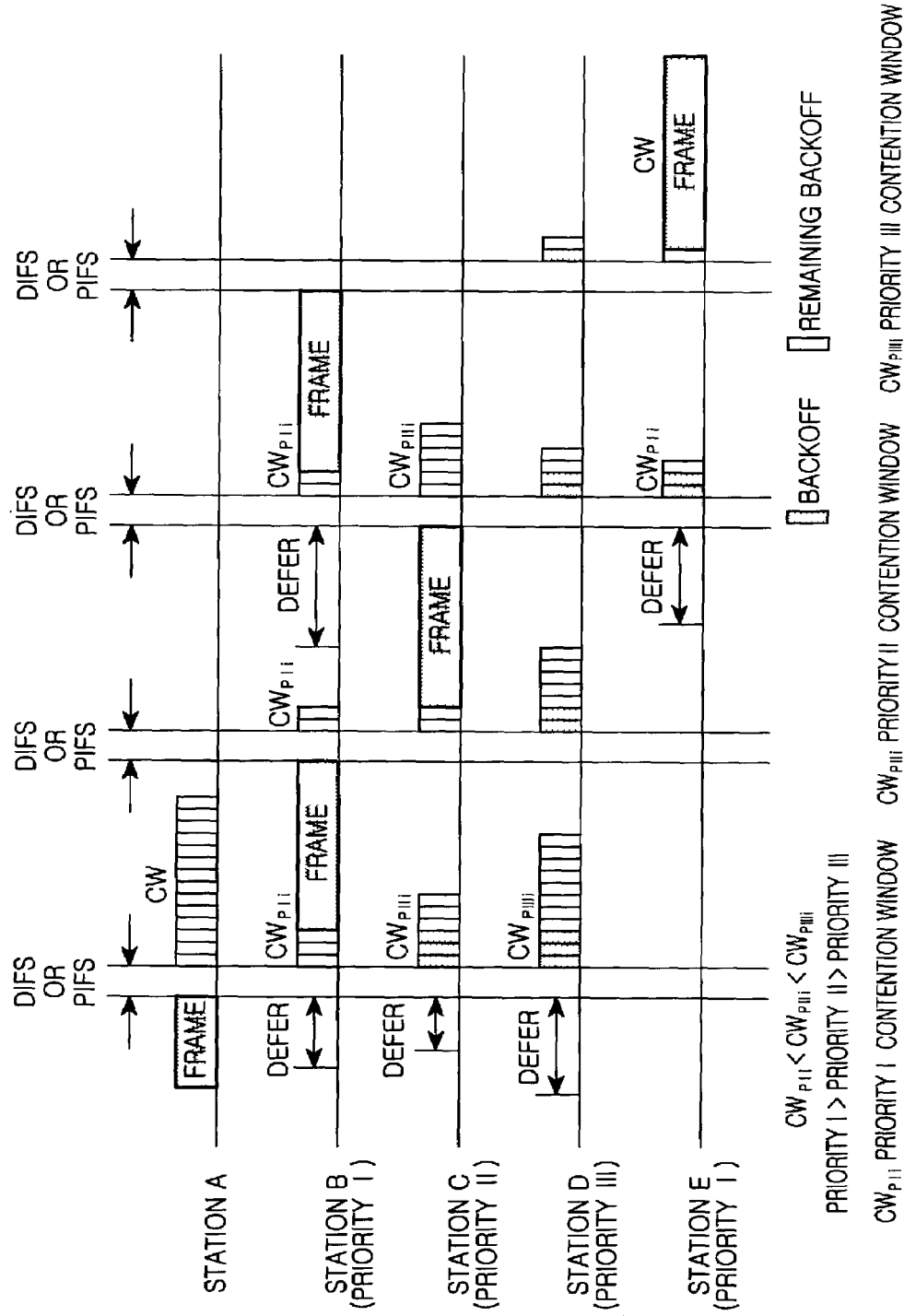
FIG. 6 is an exemplary view explaining a method for occupying a medium through a back-off procedure based on the back-off time where a plurality of stations are in a contention state in accordance with an embodiment of the present invention.

FIG. 6 is an exemplary view explaining a method for occupying a medium through a back-off procedure based on the back-off time where a plurality of stations are in a contention state in accordance with the present invention.

Referring to FIG. 6, different priorities are based on types of MPDU frames to be transmitted from the stations. Accordingly, the stations transmit the MPDU frames by occupying the medium on the basis of the priorities. When a station has an MPDU frame having a higher-order priority, it generates a smaller value of the CW based on the higher-order priority and a shorter back-off time, thereby having an opportunity to quickly occupy the medium. If video data, voice data and other data have a first-order priority I being a highest-order priority, a second-order priority II and a third-order priority III, respectively, the video data and the voice data of the time-bounded information can be effectively transmitted because they have higher-order priorities than the other data.

Figure 7:
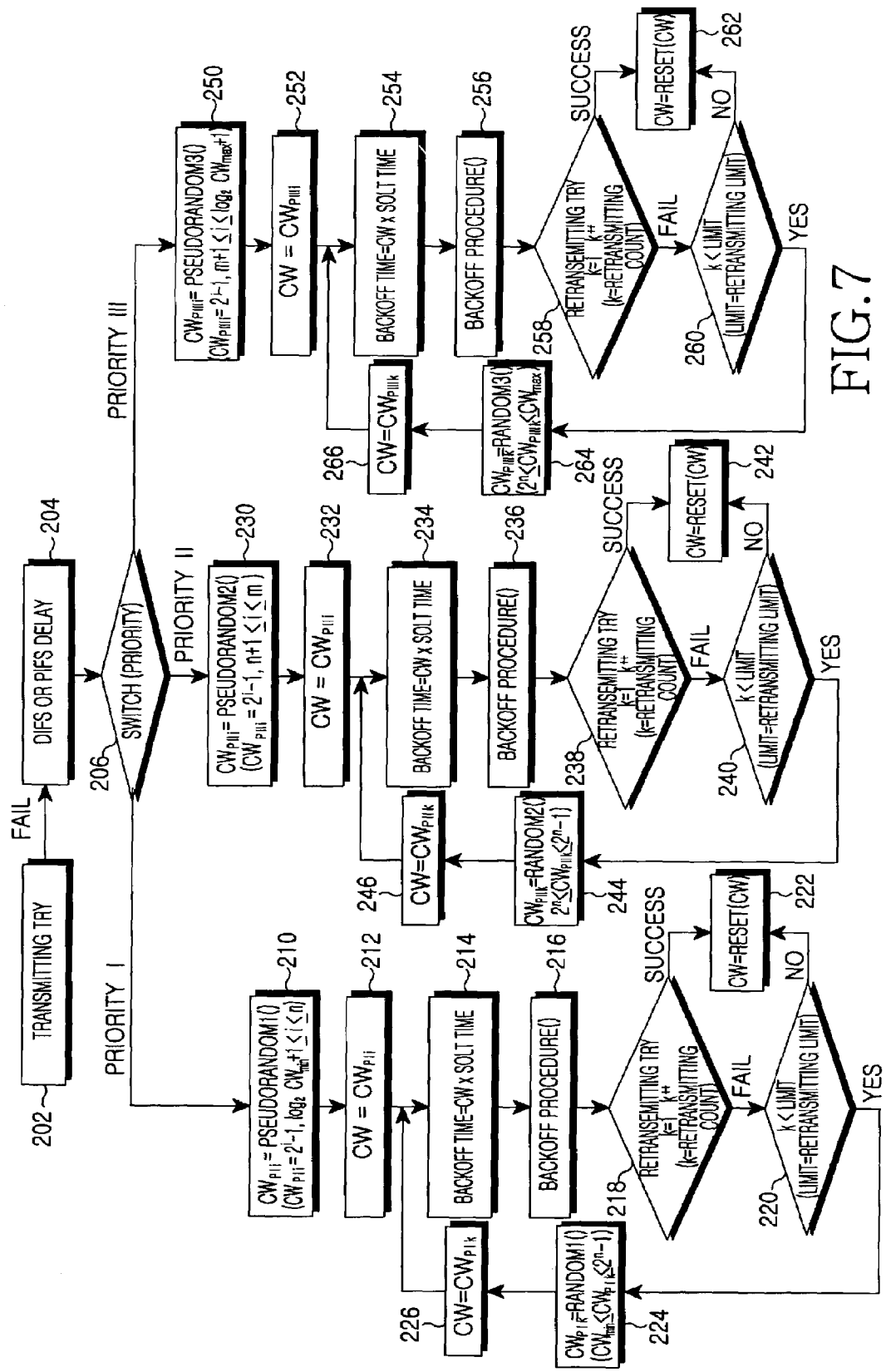
FIG. 7 is a flow chart explaining a method for occupying a medium through a back-off procedure in accordance with an embodiment of the present invention.

FIG. 7 is a flow chart explaining a method for occupying a medium through a back-off procedure in accordance with the present invention. In particular, FIG. 7 illustrates a control operation performed in a MAC hierarchy module where a station accesses one medium in a network in which a plurality of stations are coupled to the one medium.

Referring to FIG. 7, the station tries to transmit an MPDU through the medium at step 202. If the station fails to transmit the MPDU, the transmission of the MPDU is delayed for a period of time equal to a DIFS or PIFS at step 204. The station identifies a priority corresponding to the MPDU at step 206. For example, it is assumed that video data, voice data and other data have a first-order priority I being a highest-order priority, a second-order priority II and a third-order priority III, respectively.

Thereafter, the MAC hierarchy module proceeds to step 210 for the priority I, or step 230 for the priority II, or step 250 for the priority III. The MAC hierarchy module generates a pseudo random number and a CW value on a priority basis at step 210, 230 or 250. The CW value is pseudo-randomly set in a limited range on the priority basis. As a priority is higher, the CW value corresponding to the higher-order priority is smaller and therefore a back-off time after an inter-frame space is shorter. Accordingly, the station can have an opportunity to quickly occupy the medium. A back-off procedure in the present invention is the same as the conventional back-off procedure.

Referring to FIG. 7, the MAC hierarchy module generates the CW value corresponding to the priority I, II or III at step 212, 232 or 252. The MAC hierarchy module generates a back-off time based on the CW value at step 214, 234 or 254. The MAC hierarchy module occupies the medium to try to transmit the MPDU using the back-off procedure at step 216, 236 or 256.

In accordance with the present invention, the MAC hierarchy module determines whether there is a collision between data transmissions after performing the back-off procedure at step 218, 238 or 258. If there is a collision between data transmissions, the MAC hierarchy module determines whether the number of re-transmission times is less than a reference value representing a limit of the number of re-transmission times. If the number of re-transmission times is less than the reference value at step 220, 240 or 260, the MAC hierarchy module generates the CW value with a random number rather than the pseudo random number within a limited range based on the priority at step 224, 244 or 264. In steps 226, 246 and 266, the module sets the CW value equal to the generated CW value. The reason that the MAC hierarchy module generates the random number is because the number of pseudo random numbers which can be generated is limited where the collision is caused, and a probability of occurrence of the CW values corresponding to the same-order priorities is high. Where the probability of occurrence of the CW values corresponding to the same-order priorities is high, it means that a probability of a re-collision is high. Accordingly, the MAC hierarchy module in accordance with the present invention uses the random number if the station fails to transmit the MPDU, thereby minimizing the number of collisions.

Thereafter, the MAC hierarchy module performs the back-off procedure and then occupies the medium to re-try to transmit the MPDU data. Further, the station re-tries to transmit the MPDU the limited number of re-transmission times. If the transmission has succeeded or the number of transmission times has reached the limit number of re-transmission times, the CW value is re-set at step 222, 242 or 262.

As apparent from the above description, the present invention provides a method for performing an contention-based access for real-time application and a medium access control hierarchy module, which can transmit and process video data, audio data and voice data being time-bounded information through a wireless LAN within a required period of time without transmission delay and data loss. Therefore, users can transmit and receive a good quality of moving picture or video data, audio data, voice data, etc. through the wireless LAN.

Further, an operation of assigning priorities to the video data, the audio data and the voice data being time-bounded information in accordance with the present invention can be applied to both DCF and PCF access methods based on an IEEE 802.11 standard. The present invention can transmit and process the video data, the audio data and the voice data being the time-bounded information through a wireless LAN within a required period of time without transmission delay and data loss. The wireless LAN can provide a good quality of moving picture or the video data, the audio data, the voice data, etc.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims which follow, along with their full scope of equivalents.

What is claimed is:

1. A MAC (Medium Access Control) hierarchy module for performing a back-off procedure for real-time application in a station having a frame to be transmitted in a network including a plurality of stations, comprising:
   a priority identification sub-module for identifying a priority of each data to be transmitted;
   a first CW (Contention Window) generation sub-module for pseudo-randomly generating a CW value based on the priority of the data to be transmitted;
   a back-off time calculation/back-off process sub-module for calculating a back-off time based on the CW value and performing the back-off procedure based on the back-off time; and
   a second CW generation sub-module for randomly generating another CW value when there is a collision between transmissions of data having same-order priorities within a limited range based on a priority basis and based on the generated CW value after the back-off procedure has been performed.

2. A method for performing a contention-based access for real-time application in a station having a frame to be transmitted in a network including a plurality of stations, comprising the steps of:
   a) identifying a priority of an MPDU (MAC Protocol Data Unit) to be transmitted through a medium if there is a collision between transmissions of data;
   b) pseudo-randomly generating a CW (Contention Window) value within a limited range based on the identified priority; and
   c) if there is a re-collision between transmissions of data after a back-off procedure has been performed, randomly generating another CW value within a limited range based on a priority basis and based on the CW value generated based on the identified priority of the MPDU.

3. The method as set forth in claim 2, further comprising the step of:
   d) determining whether the number of re-transmission times is less than a reference value, when the MPDU is re-transmitted after a collision between transmissions of data.

4. The method as set forth in claim 2, wherein the MPDU being time-bounded information has a higher-order priority.

* * * * *